US012646194B2

(12) United States Patent
Zhang

(10) Patent No.: US 12,646,194 B2
(45) Date of Patent: Jun. 2, 2026

(54) SURFACE NORMAL PREDICTION USING PAIR-WISE ANGULAR TRAINING

(71) Applicant: ADOBE INC., San Jose, CA (US)

(72) Inventor: Jianming Zhang, Fremont, CA (US)

(73) Assignee: ADOBE INC., San Jose, CA (US)

( * ) Notice: Subject to any disclaimer, the term of this patent is extended or adjusted under 35 U.S.C. 154(b) by 543 days.

(21) Appl. No.: 18/076,855

(22) Filed: Dec. 7, 2022

(65) Prior Publication Data

US 2024/0193802 A1 Jun. 13, 2024

(51) Int. Cl.
*G06T 7/60* (2017.01)
*G06T 7/73* (2017.01)

(52) U.S. Cl.
CPC .................. *G06T 7/60* (2013.01); *G06T 7/74* (2017.01); *G06T 2207/20081* (2013.01)

(58) Field of Classification Search
CPC .... G06T 7/60; G06T 7/74; G06T 2207/20081
See application file for complete search history.

(56) References Cited

U.S. PATENT DOCUMENTS

2021/0150278 A1* 5/2021 Dudzik ................... G06T 7/593
2022/0414928 A1* 12/2022 Venkataraman ....... G06V 10/82

OTHER PUBLICATIONS

Yin et al. (Learning to recover 3D Scene Shape from a Single Image, Dec. 2020, IEEE (Year: 2020).*

* cited by examiner

*Primary Examiner* — Wednel Cadeau
(74) *Attorney, Agent, or Firm* — Shook Hardy & Bacon L.L.P.

(57) ABSTRACT

A surface normal model is trained to predict normal maps from single images using pair-wise angular losses. A training dataset comprising a training image and a ground truth normal map for the training image is received. To train the surface normal model using the training dataset, a predicted normal map is generated for the training image using the surface normal model. A loss is determined as a function of angular values between pairs of normal vectors for the predicted normal map and corresponding angular values between pairs of normal vectors for the ground truth normal map. The surface normal model is updated based on the loss.

20 Claims, 10 Drawing Sheets
(2 of 10 Drawing Sheet(s) Filed in Color)

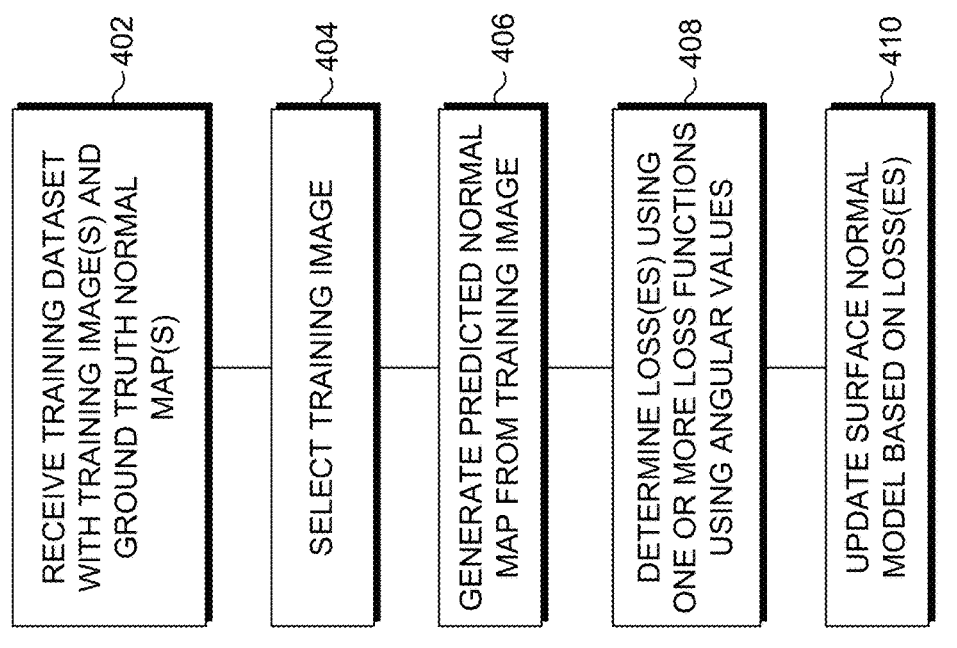
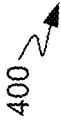
RECEIVE TRAINING DATASET WITH TRAINING IMAGE(S) AND GROUND TRUTH NORMAL MAP(S) ⌇402
SELECT TRAINING IMAGE ⌇404
GENERATE PREDICTED NORMAL MAP FROM TRAINING IMAGE ⌇406
DETERMINE LOSS(ES) USING ONE OR MORE LOSS FUNCTIONS USING ANGULAR VALUES ⌇408
UPDATE SURFACE NORMAL MODEL BASED ON LOSS(ES) ⌇410
400
*FIG. 4.*

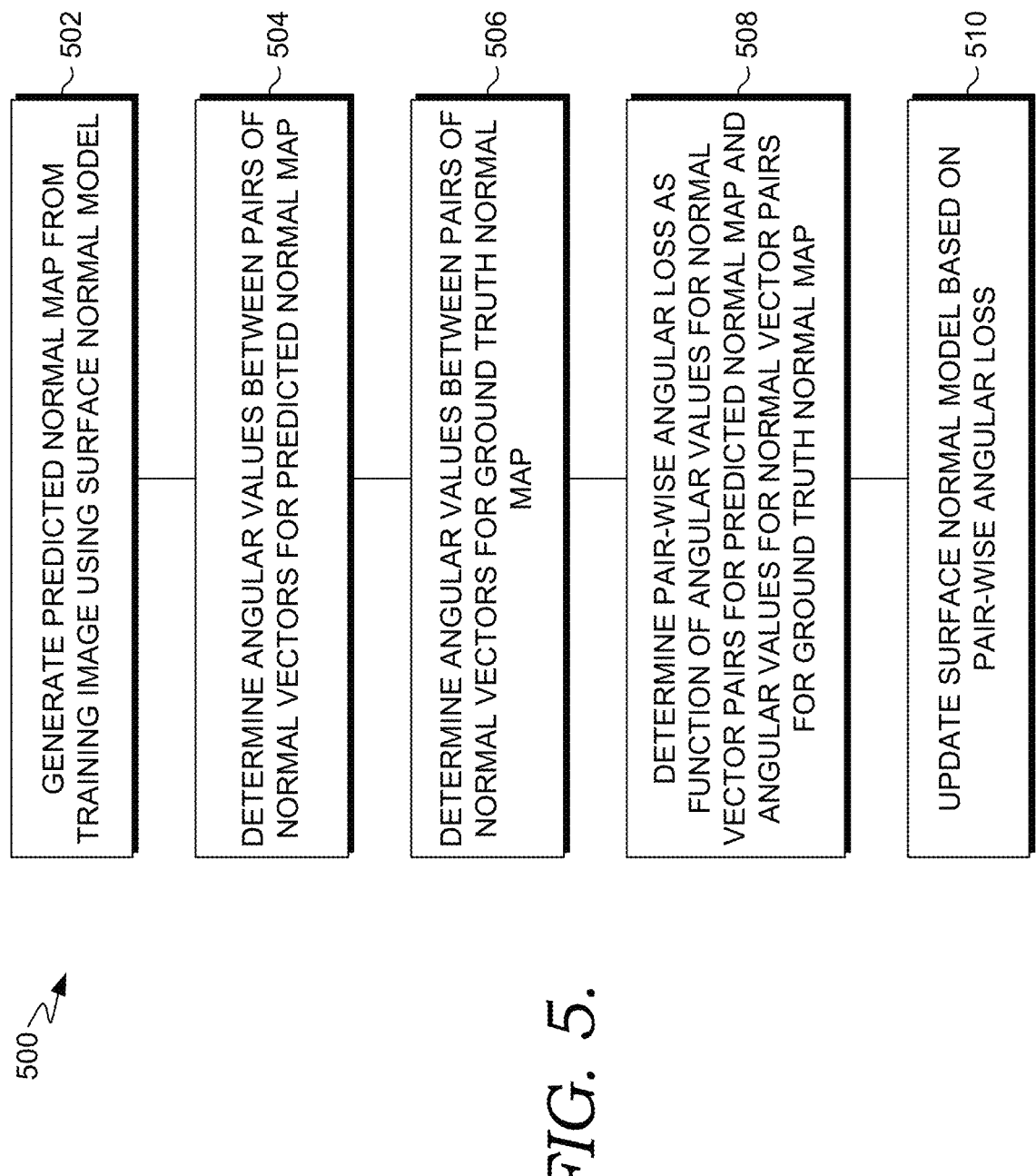

500

502 GENERATE PREDICTED NORMAL MAP FROM TRAINING IMAGE USING SURFACE NORMAL MODEL

504 DETERMINE ANGULAR VALUES BETWEEN PAIRS OF NORMAL VECTORS FOR PREDICTED NORMAL MAP

506 DETERMINE ANGULAR VALUES BETWEEN PAIRS OF NORMAL VECTORS FOR GROUND TRUTH NORMAL MAP

508 DETERMINE PAIR-WISE ANGULAR LOSS AS FUNCTION OF ANGULAR VALUES FOR NORMAL VECTOR PAIRS FOR PREDICTED NORMAL MAP AND ANGULAR VALUES FOR NORMAL VECTOR PAIRS FOR GROUND TRUTH NORMAL MAP

510 UPDATE SURFACE NORMAL MODEL BASED ON PAIR-WISE ANGULAR LOSS

FIG. 5.

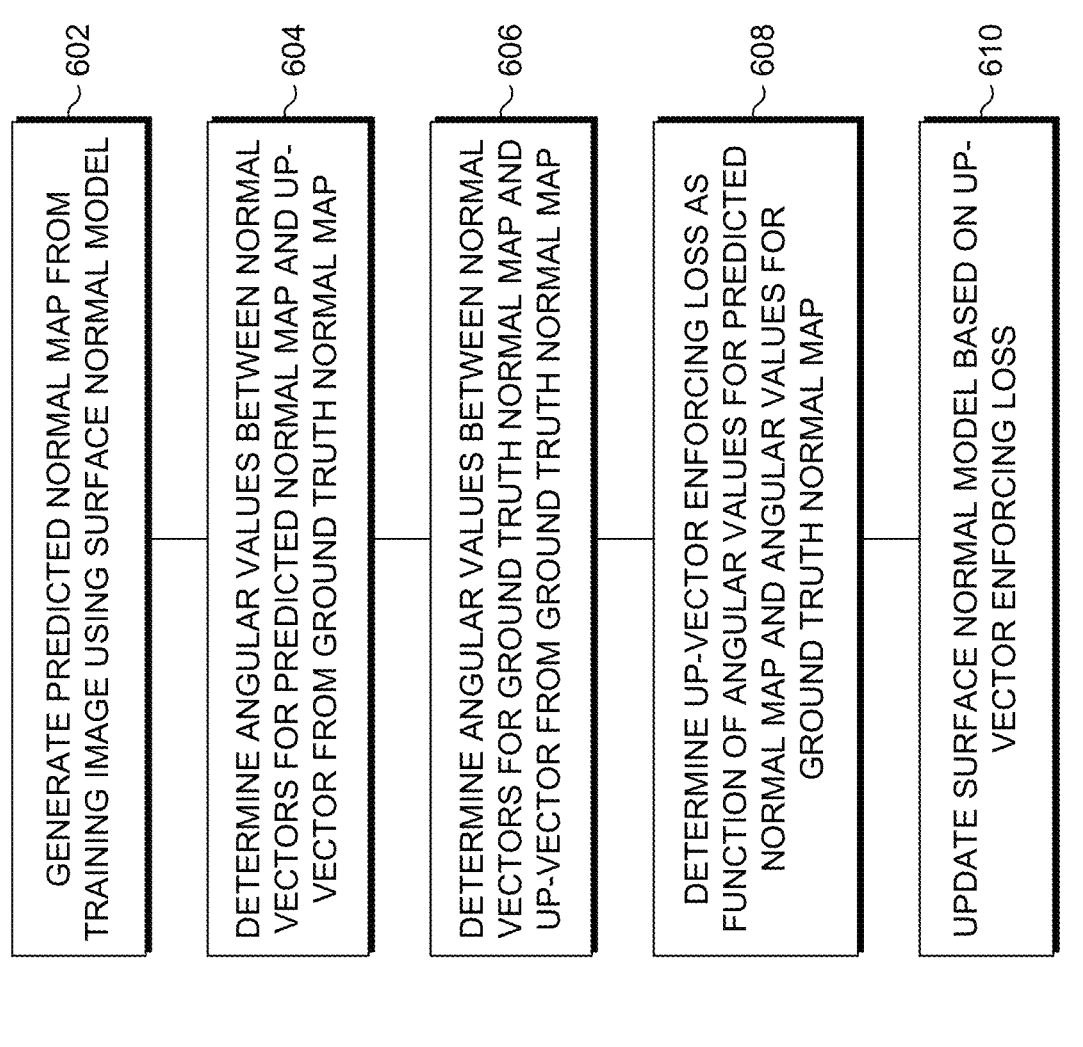

600

602
GENERATE PREDICTED NORMAL MAP FROM TRAINING IMAGE USING SURFACE NORMAL MODEL

604
DETERMINE ANGULAR VALUES BETWEEN NORMAL VECTORS FOR PREDICTED NORMAL MAP AND UP-VECTOR FROM GROUND TRUTH NORMAL MAP

606
DETERMINE ANGULAR VALUES BETWEEN NORMAL VECTORS FOR GROUND TRUTH NORMAL MAP AND UP-VECTOR FROM GROUND TRUTH NORMAL MAP

608
DETERMINE UP-VECTOR ENFORCING LOSS AS FUNCTION OF ANGULAR VALUES FOR PREDICTED NORMAL MAP AND ANGULAR VALUES FOR GROUND TRUTH NORMAL MAP

610
UPDATE SURFACE NORMAL MODEL BASED ON UP-VECTOR ENFORCING LOSS

802 — RECEIVE TRAINING IMAGE, COARSE NORMAL MAP, AND GROUND TRUTH NORMAL MAP

804 — GENERATE REFINED NORMAL MAP FROM TRAINING IMAGE AND COARSE NORMAL MAP USING REFINEMENT MODEL

806 — DETERMINE PIXEL-WISE LOSS AS FUNCTION OF NORMAL VECTORS FROM REFINED NORMAL MAP AND GROUND TRUTH NORMAL MAP

808 — UPDATE REFINEMENT MODEL BASED ON PIXEL-WISE LOSS

RECEIVE INPUT IMAGE ~902

GENERATE PREDICTED NORMAL MAP FROM IMAGE USING SURFACE NORMAL MODEL ~904

GENERATE REFINED NORMAL MAP FROM IMAGE AND PREDICTED NORMAL MAP USING REFINEMENT MODEL ~906

900

SURFACE NORMAL PREDICTION USING PAIR-WISE ANGULAR TRAINING

BACKGROUND

Surface normal prediction for a two-dimensional image (e.g., an RGB image) is a process of estimating normal vectors from the image. Each normal vector is a vector that is perpendicular to a surface at a given point of an object in the image. Surface normal prediction from a single image is a fundamental task in computer vision. A robust surface normal estimation can benefit a variety of downstream applications, including, for instance, multi-view 3D reconstruction, image relighting, image to image translation, decaling, and object insertion.

SUMMARY

Some aspects of the present technology relate to, among other things, surface normal prediction using a surface normal model trained using a pair-wise angular loss based on angular values between normal vectors. In accordance with some aspects, the surface normal model is trained using a training dataset with training images and corresponding ground truth normal maps over one or more iterations. At each iteration, a predicted normal map is generated from a training image by the surface normal model. Angular values between pairs of normal vectors for the predicted normal map are determined, and corresponding angular values between pairs of normal vectors for the ground truth normal map are also determined. A pair-wise angular loss is determined as a function of differences between the angular values for the normal map and the corresponding angular values for the ground truth normal map. The surface normal map is updated based on the pair-wise angular loss.

In some aspects, one or more additional loss functions are used to train the surface normal model, including an up-vector enforcing loss function and a rotation invariant gradient loss function. The up-vector enforcing loss is determined as a function of angular values between normal vectors from the predicted normal map and an up-vector from the ground truth normal map and corresponding angular values between normal vectors from the ground truth normal map and an up-vector from the ground truth normal map. The rotation invariant gradient loss is determined as a function of gradients in the x- and y-directions, angular values between normal vectors from the predicted normal map and a mean normal vector for the predicted normal map, and corresponding angular values between normal vectors from the ground truth normal map and a mean normal vector for the ground truth normal map.

Further aspects train a refinement model to upsample a predicted normal map from the surface normal model to generate a refined normal map at a higher resolution. Given a training image and a coarse normal map, the refinement model generates a refined normal map. A pixel-wise loss is determined as a function of differences between normal vectors from corresponding locations on the refined normal map and the ground truth normal map. The refinement model is updated based on the pixel-wise loss.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The present technology is described in detail below with reference to the attached drawing figures, wherein:

FIG. 4 is a flow diagram showing a method for training a surface normal model using angular values in accordance with some implementations of the present disclosure;

FIG. 5 is a flow diagram showing a method for training a surface normal model using a pair-wise angular loss in accordance with some implementations of the present disclosure;

FIG. 6 is a flow diagram showing a method for training a surface normal model using an up-vector enforcing loss in accordance with some implementations of the present disclosure;

DETAILED DESCRIPTION

Definitions

Figure 1:
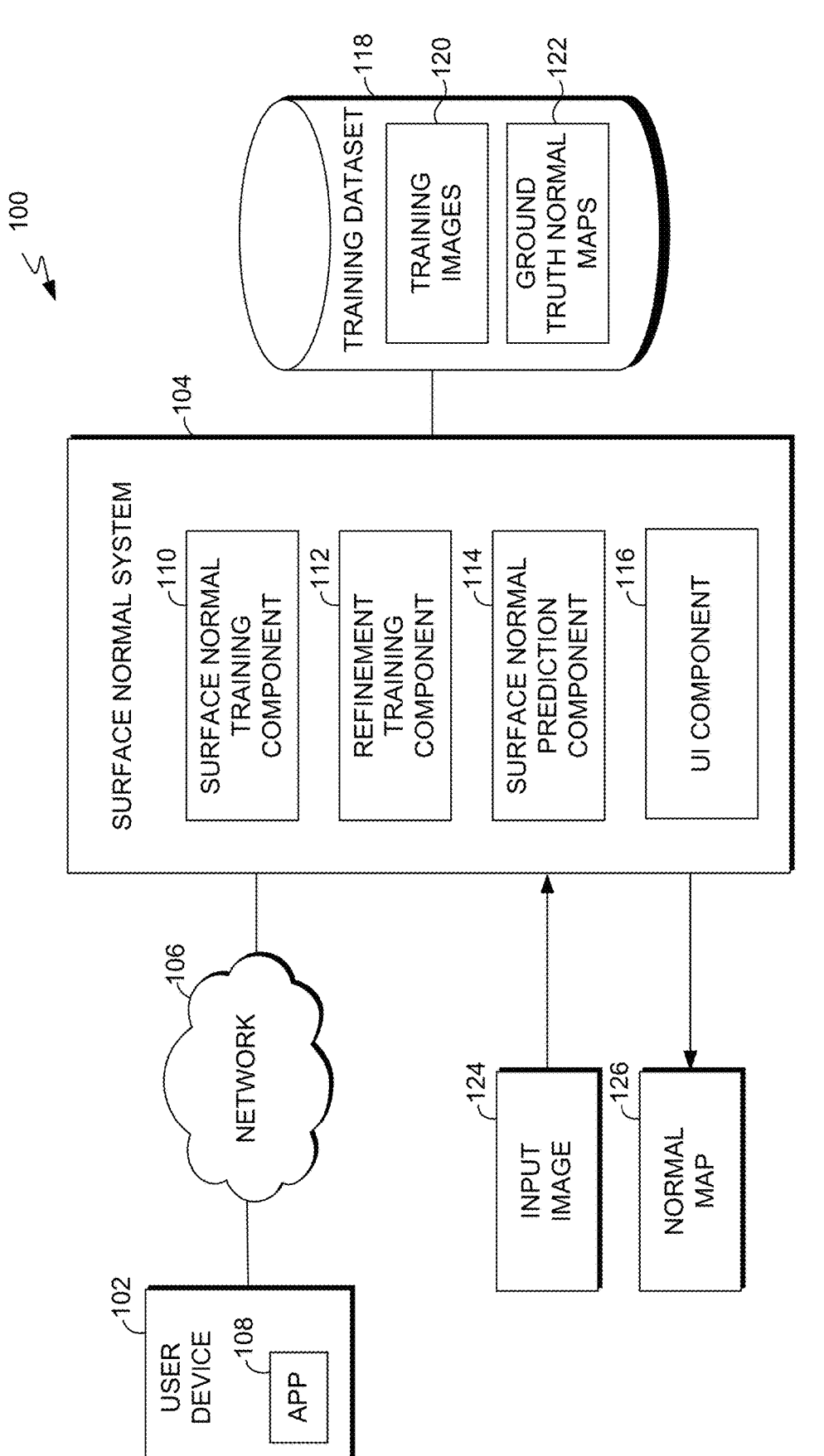
FIG. 1 is a block diagram illustrating an exemplary system in accordance with some implementations of the present disclosure.

Various terms are used throughout this description. Definitions of some terms are included below to provide a clearer understanding of the ideas disclosed herein.

As used herein, a "training dataset" refers to data used to train one or models for generating normal maps for images. A training dataset in accordance with some aspects of the technology described herein includes one or more training images and a ground truth normal map for each training image. In accordance with some aspects, the training dataset comprises a mixed dataset that includes a plurality of training images in which the coordinate systems of at least a portion of the training images vary and/or are unknown.

A "normal vector" is used herein to refer to a vector that is perpendicular to a surface at a given point of an object in an image.

A "normal map" for an input image refers to a data structure that provides normal vectors for pixels from the input image. In some instances, a normal map for an input image comprises an image in which each pixel of the image provides a normal vector for a corresponding pixel from the input image. In some implementations, a normal map comprises an RGB image in which the color values for each pixel represent a normal vector for the pixel.

A "ground truth normal map" refers to a normal map for a training image that provides ground truth normal vectors for the training image.

A "predicted normal map" refers to a normal map for an image predicted by a surface normal model trained to generate normal maps from images.

A "refined normal map" refers to a higher-resolution version of a normal map. In accordance with some aspects of the technology described herein, a refined normal map is generated from a lower-resolution normal map using refinement model.

As used herein, an "angular value" refers to a value based on an angle between two vectors. In some instances, an angular value between two vectors is based on a cosine function or dot product between the two vectors.

An "up-vector" for an image is used herein to refer to a normal vector that is aligned with an up direction in an image. An up-vector can be labeled in a ground truth normal map for a training image. In some aspects of the technology described herein, an up-vector for a training image is used during training when the training image uses the world coordinate system.

Overview

Predicting surface normal from a single image (e.g., an RGB image) is a task that supports many 3D image applications, such as, for instance, relighting, decaling, object insertion, and multi-view reconstruction. Conventional approaches to predicting surface normal from a single image involve training models (e.g., neural networks) to generate normal maps with predicted normal vectors using training images and ground truth normal maps for the training images. These approaches formulate the training as a pixel-wise regression task that minimizes the difference between the predicted normal vector and the ground truth normal vector at each pixel location. However, using pixel-wise regression presents a number of drawbacks. For instance, under different coordinate systems, the normal vector values will change. These conventional approaches predict the normal map under the camera-centric coordinate system, which is extremely ambiguous to define and sensitive to camera configurations. This problem limits the capacity to leverage diverse training data from different sources and camera setups.

Aspects of the technology described herein improve the functioning of the computer itself in light of these shortcomings in existing technologies by providing a system that facilitates training a surface normal model for robust and generalizable single image surface normal prediction using mixed training datasets having training images with different and/or unknown coordinate systems. Instead of formulating the training as a pixel-wise regression task as in conventional approaches, the technology described herein formulates the training as a pair-wise angular regression task using a pair-wise angular loss function.

During training, the surface normal model generates a predicted normal map from a training image. A pair-wise angular loss is computed based on angular values between pairs of normal vectors from the predicted normal map and corresponding pairs of normal vectors from the ground truth normal map for the training image. The surface normal model is then updated (e.g., using backpropagation) based on the pair-wise angular loss. This process can be iterated over a number of training images to provide a trained surface normal model. Once trained, the surface normal map can be used to generate a predicted normal map for a given input image.

Some aspects of the technology described herein employ one or more additional loss functions to train the surface normal model. In accordance with some aspects, to make the surface normal model more aware of the ground plane and the vertical direction, an up-vector enforcing loss is used during training to enforce the surface normal model to predict the up-vector consistent with the world coordinate system. The up-vector enforcing loss is based on angular values between normal vectors and the up-vector from the ground truth normal map. This supports identifying a horizontal supporting plane, such as ground, and vertical planes, such as walls, from a predicted normal map. In some aspects, a rotation invariant gradient loss is used during training as a regularizer to make the normal map prediction smoother in homogeneous regions and sharper at boundary regions. The rotation invariant gradient loss employs gradients along x- and y-directions with angular values between sampled normal vectors and mean normal vectors for the predicted normal map and ground truth normal map.

Further aspects train a refinement model to upsample a lower-resolution normal map from the surface normal model to a higher-resolution normal map. In some configurations, the refinement model is trained using a pixel-wise regression loss between a refined normal map predicted by the refinement model and the ground truth normal map. Once trained, the refinement model takes an input image and a predicted normal map generated from the input image by the surface normal model and generates a refined normal map with a higher resolution than the predicted normal map.

Aspects of the technology described herein provide a number of improvements over existing technologies. For instance, the technology described herein employs angular values between normal vector pairs rather than absolute values of normal vectors as in conventional approaches. The absolute normal vector values used by conventional approaches are defined by a specific coordinate system and are very hard to predict in general without knowing the camera setup. In contrast, the pair-wise angular losses used by the technology described herein are invariant to coordinate system. For example, if two normal vectors are perpendicular to each other (e.g. ground vs. wall), their relation will remain the same regardless of the coordinate system. As such, the our pair-wise angular losses used by aspects described herein enable efficient and effective training from mixed training data. The losses employed herein are rotation invariant, making the model training robust to different camera configurations, and enables semantic understanding of horizontal and vertical surface planes. As a result, the surface normal model described herein significantly surpasses prior approaches in generalization and accuracy.

Example System for Surface Normal Prediction

With reference now to the drawings, FIG. 1 is a block diagram illustrating an exemplary system 100 for surface normal prediction from images in accordance with implementations of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements can be omitted altogether. Further, many of the elements described herein are functional entities that can be implemented as discrete or distributed components or in conjunction with other components, and in any suitable combination and location. Various functions described herein as being performed by one or more entities can be carried out by hardware, firmware, and/or software. For instance, various functions can be carried out by a processor executing instructions stored in memory.

The system 100 is an example of a suitable architecture for implementing certain aspects of the present disclosure. Among other components not shown, the system 100 includes a user device 102 and a surface normal system 104. Each of the user device 102 and surface normal system 104 shown in FIG. 1 can comprise one or more computer devices, such as the computing device 1000 of FIG. 10, discussed below. As shown in FIG. 1, the user device 102 and the surface normal system 104 can communicate via a network 106, which can include, without limitation, one or more local area networks (LANs) and/or wide area networks (WANs). Such networking environments are commonplace in offices, enterprise-wide computer networks, intranets, and the Internet. It should be understood that any number of client devices and server devices can be employed within the system 100 within the scope of the present technology. Each can comprise a single device or multiple devices cooperating in a distributed environment. For instance, the surface normal system 104 could be provided by multiple server devices collectively providing the functionality of the surface normal system 104 as described herein. Additionally, other components not shown can also be included within the network environment.

The user device 102 can be a client device on the client-side of operating environment 100, while the surface normal system 104 can be on the server-side of operating environment 100. The surface normal system 104 can comprise server-side software designed to work in conjunction with client-side software on the user device 102 so as to implement any combination of the features and functionalities discussed in the present disclosure. For instance, the user device 102 can include an application 108 for interacting with the surface normal system 104. The application 108 can be, for instance, a web browser or a dedicated application for providing functions, such as those described herein. This division of operating environment 100 is provided to illustrate one example of a suitable environment, and there is no requirement for each implementation that any combination of the user device 102 and the surface normal system 104 remain as separate entities. While the operating environment 100 illustrates a configuration in a networked environment with a separate user device and surface normal system, it should be understood that other configurations can be employed in which components are combined. For instance, in some configurations, a user device can also provide capabilities of the technology described herein.

The user device 102 can comprise any type of computing device capable of use by a user. For example, in one aspect, the user device can be the type of computing device 1000 described in relation to FIG. 10 herein. By way of example and not limitation, the user device 102 can be embodied as a personal computer (PC), a laptop computer, a mobile or mobile device, a smartphone, a tablet computer, a smart watch, a wearable computer, a personal digital assistant (PDA), an MP3 player, global positioning system (GPS) or device, video player, handheld communications device, gaming device or system, entertainment system, vehicle computer system, embedded system controller, remote control, appliance, consumer electronic device, a workstation, or any combination of these delineated devices, or any other suitable device. A user can be associated with the user device 102 and can interact with the surface normal system 104 via the user device 102.

At a high level, the surface normal system 104 trains one or more models that perform surface normal predictions for images. For instance, given an input image, such as the input image 124, the surface normal system generates a normal map, such as the normal map 126. In accordance with aspects of the technology described herein, a surface normal model is trained to predict normal vectors for images using a pair-wise angular loss based on angular values between pairs of normal vectors for a predicted normal map and corresponding angular values between pairs of normal vectors for a ground truth normal map. In some aspects, the surface normal model is trained using one or more additional losses, including an up-vector enforcing loss and a rotation invariant gradient loss, as will be described in more detail below. In some configurations, the surface normal model provides a lower-resolution normal map for an input image, and a refinement model produces a higher-resolution normal map from the input image and the lower-resolution normal map.

As shown in FIG. 1, the surface normal system 104 includes a surface normal training component 110, a refinement training component 112, a surface normal prediction component 114, and a user interface component 116. The components of the surface normal system 104 can be in addition to other components that provide further additional functions beyond the features described herein. The surface normal system 104 can be implemented using one or more server devices, one or more platforms with corresponding application programming interfaces, cloud infrastructure, and the like. While the surface normal system 104 is shown separate from the user device 102 in the configuration of FIG. 1, it should be understood that in other configurations, some or all of the functions of the surface normal system 104 can be provided on the user device 102.

In one aspect, the functions performed by components of the surface normal system 104 are associated with one or more applications, services, or routines. In particular, such applications, services, or routines can operate on one or more user devices, servers, can be distributed across one or more user devices and servers, or be implemented in the cloud. Moreover, in some aspects, these components of the surface normal system 104 can be distributed across a network, including one or more servers and client devices, in the cloud, and/or can reside on a user device. Moreover, these components, functions performed by these components, or services carried out by these components can be implemented at appropriate abstraction layer(s) such as the operating system layer, application layer, hardware layer, etc., of the computing system(s). Alternatively, or in addition, the functionality of these components and/or the aspects of the technology described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein with regards to specific components shown in example system 100, it is contemplated that in some aspects, functionality of these components can be shared or distributed across other components.

The surface normal training component 110 of the surface normal system 104 trains a surface normal model to generate normal maps from input images. The surface normal model can comprise a neural network, such as, for instance, a convolutional neural network or transformer. When trained, the surface normal model predicts a normal map from a single input image. The surface normal training component 110 trains the surface normal model using a training dataset 118 that includes training images 120 and ground truth normal maps 122 (which includes a ground truth normal map for each training image). The training dataset 118 can be mixed in the sense that the coordinate systems of the training images 120 vary and/or are otherwise unknown.

The surface normal training component 110 trains the surface normal model over any number of iterations. At each iteration, the surface normal model generates a predicted normal map from a training image, and the surface normal model is updated (e.g., using backpropagation) based on one or more losses computed from the predicted normal map and the ground truth normal map for the training image. In accordance with various aspects of the technology described herein, the loss functions used to train the surface normal model include any combination of: a pair-wise angular loss, an up-vector enforcing loss, and a rotation invariant gradient loss. Each of the loss functions are described in further detail below.

Pair-wise Angular Loss: The pair-wise angular loss function minimizes a difference between angular values for pairs of normal vectors from the predicted normal map and corresponding pairs of normal vectors from the ground truth normal map.

Figure 2:
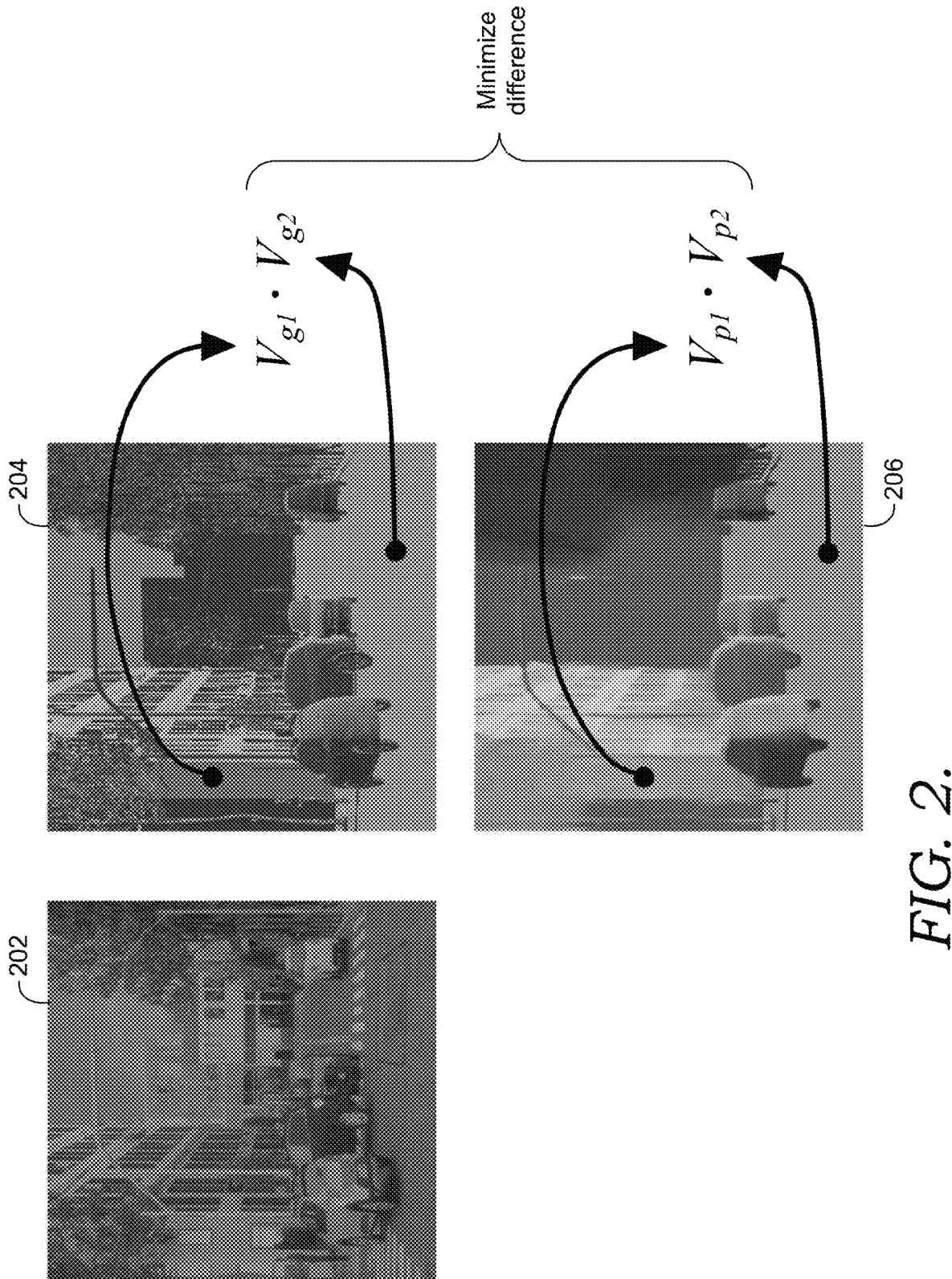
FIG. 2 is a diagram illustrating pair-wise angular loss in accordance with some implementations of the present disclosure.

In some configurations, the pairs of normal vectors used by the pair-wise angular loss function are from corresponding pairs of pixels from the predicted normal map and the ground truth normal map. This is illustrated in FIG. 2. In particular, FIG. 2 shows a training image 202, a ground truth normal map 204 for the training image, and a predicted normal map 206 generated by a surface normal model using the training image 202. In the example of FIG. 2, a pair of normal vectors, $V_{g1}$ and $V_{g2}$, is sampled from a pair of locations of the ground truth normal map 204. Similarly, a pair of normal vectors, $V_{p1}$ and $V_{p2}$, is sampled from the same locations of the predicted normal map 206. An angular value (e.g., cosine function, dot product, etc.) is computed for each pair of normal vectors, and a loss is computed from the difference in angular values.

More particularly, given a training image, the surface normal training component 110 samples (e.g., randomly) a set of pixel pairs $$\{(i_1, i_2)\}_{i=1}^{N}$$

where i represents a pixel location in the training image. For each such pixel pair on the ground truth normal map G, the surface normal training component 110 computes an angular value between the normal vectors from those locations. For instance, the angular value can be based on the cosine function between the normal vectors:

$$\cos(V_{i1}^{g} \cdot V_{i2}^{g}) = V_{i1}^{g} \cdot V_{i2}^{g}$$

where $$V_{i1}^{g} \text{ and } V_{i2}^{g}$$

represent a normal vector for a first and second pixel, respectively, from the ground truth normal map.

Similarly, the surface normal training component 110 computes an angular value between the normal vectors for the pair of locations on the predicted normal map P. For instance, the angular value can be based on the cosine function between the normal vectors:

$$\cos(V_{i1}^{p} \cdot V_{v2}^{p}) = V_{i1}^{p} \cdot V_{i2}^{p}$$

It is assumed that both P and G are L2-normalized so that each normal vector from these maps has a unit L2 norm.

The pair-wise angular loss is computed as a function of the difference between corresponding angular values from the predicted normal map and the ground truth normal map. In an example in which angular loss is based on dot product, the pair-wise angular loss can be defined as:

$$L_{PWA}\left(P, G; \{(i_1, i_2)\}_{i=1}^{N}\right) = \frac{1}{N}\sum_{i=1}^{N}\left|V_{i1}^{P} \cdot V_{i2}^{P} - V_{i1}^{G} \cdot V_{i2}^{G}\right|^{k}, \tag{1}$$

where k=1 or 2. When k=1, it is the L1 loss; when k=2, it is the MSE loss. It should be understood that other types of losses may be employed.

In other configurations, instead of using the angular values between normal vectors from pairs of pixels, the pair-wise angular loss uses the angular value between a normal vector from a pixel location and a mean normal vector for each of the predicted normal map and the ground truth normal map. More particularly, for each pixel location, an angular value is computed between the normal vector from that location on the predicted normal map and a mean normal vector for the predicted normal map. Similarly, an angular value is computed between the normal vector from that location on the ground truth normal map and a mean normal vector for the ground truth normal map. The pair-wise angular loss is computed as a function of the difference between these corresponding angular values from the predicted normal map and the ground truth normal map. In an example in which angular value is based on dot product, the pair-wise angular loss can be defined as:

$$L_{PWA}(P, G) = \frac{1}{HW}\sum_{i}\left|V_i^{P^*} \cdot \overline{V}^{P} - V_i^{G} \cdot \overline{V}^{G}\right|^{k} \tag{2}$$

where, $\overline{V}^{P}$ and $\overline{V}^{g}$ are the mean normal vector for the predicted normal map and ground truth normal map, respectively, and the loss is computed densely on each pixel without sampling. H and W are the image height and width, and k=1 or 2. When k=1, it is the L1 loss; when k=2, it is the MSE loss. It should be understood that other types of losses may be employed.

The pair-wise angular loss can be applied to any type of data, even those data with sparse annotations on perpendicular planes. The pair-wise angular loss is rotation invariant and the specific coordinate system used by the data has no effect on the loss computation.

Up-vector Enforcing Loss: Enforcing a predicted normal map's up direction is useful for applications such as support plane detection. In accordance with some configurations, the surface normal training component 110 employs an up-vector enforcing loss to make the support plane in the predicted normal map have the up-vector (e.g. (0, 0, 1) when the z axis is the up direction in the world coordinate system) as the normal. It follows that the vertical planes, such as walls, are perpendicular to the up-vector.

The surface normal training component 110 samples pixel locations. For each pixel location, the surface normal training component 110 computes an angular value between the normal vector for that location on the predicted normal map and an up-vector from the ground truth normal map. Similarly, the surface normal training component 110 computes an angular value between the normal vector for that location on the ground truth normal map and the up-vector labeled in the ground truth normal map. The up-vector enforcing loss is determined as a function of the difference between the angular values for the predicted normal map and the ground truth normal map. In an example in which angular value is based on dot product, the up-vector enforcing loss can be defined as:

$$L_{UVE}(P, G) = \frac{1}{HW} \sum_i |V_i^P \cdot V_{up} - V_i^G \cdot V_{up}|^k \qquad (3)$$

where H and W are the image height and width, $V_{up}$ is the up-vector, and k=1 or 2. When k=1, it is the L1 loss; when k=2, it is the MSE loss. It should be understood that other types of losses may be employed.

This up-vector enforcing loss is applicable to training images that use world coordinate system. As such, in some configurations, the up-vector enforcing loss would not be applied to training images in the training dataset 118 that do not use world coordinate system.

Rotation Invariant Gradient Loss: Gradient defines local variations, indicating how much local variations occur moving from pixel to pixel. In some aspects, the surface normal training component 110 employs a rotation invariant gradient loss so that a predicted normal map has smooth changes in homogeneous regions while sharp changes at edges. The gradient loss used in some aspects is rotation invariant as it is applied to angular values between normal vectors and mean normal vectors for a predicted normal map and ground truth normal map. In an example in which angular value is based on dot product, the rotation invariant gradient loss can be defined as:

$$L_{RIMSG} = \qquad (4)$$
$$\frac{1}{HW} \sum_i |\Delta_x(V_i^P \cdot \overline{V}^P) - \Delta_x(V_i^G \cdot \overline{V}^G)|^k + |\Delta_y(V_i^P \cdot \overline{V}^P) - \Delta_y(V_i^G \cdot \overline{V}^G)|$$

where $\Delta_x$ and $\Delta_y$ are the gradients along the x and y direction, respectively. The rotation invariant gradient loss can be applicable to any kind of training data.

In some aspects, the rotation invariant gradient loss is multi-scale. In particular, x- and y-gradients can be affected by change of resolution in images. As such, a rotation invariant multi-scale gradient loss can be employed by computing over different scales (i.e., resolutions) for a training image, as opposed to a single scale represented by equation (4).

Some training datasets have invalid pixels in the ground truth normal maps. Accordingly, in some aspects, the surface normal training component 110 can compute each of the losses discussed above only on valid pixels. For instance, a valid pixel mask can be used such that the losses are computed only on valid pixels.

The refinement model training component 112 of the surface normal system 104 trains a refinement model to upsample a predicted normal map from the surface normal model to a refined normal map having a higher resolution. The refinement model training component 112 trains the refinement model using the training images 120 and ground truth normal maps 122 from the training dataset 118, as well as coarse normal maps for the training images 120. In some aspects, the coarse normal map for a given training image is a predicted normal map from the surface normal model. In other aspects, the coarse normal map for a given training image is generated from the ground truth normal map for the training image. For instance, a coarse normal map can be generated by blurring and corrupting a ground truth normal map (e.g., resizing, adding Gaussian Noise).

As the refinement model provides a higher-resolution normal map that follows a lower-resolution map's coordinate system, the refinement training component 112 uses a pixel-wise regression loss to train the refinement model in some configurations. During training, the refinement model takes a training image and the coarse normal map for the training image as input, and outputs a refined normal map. A pixel-wise loss is computed based on the difference between normal vectors in the refined normal map and corresponding normal vectors from the ground truth normal map. For instance, the loss can be computed by:

$$L(P, G) = \frac{1}{HW} \sum_i |V_i^P - V_i^G| \qquad (5)$$

After training, the surface normal model and refinement model can be used by the surface normal prediction component 114 to generate a normal map, such as the normal map 126, from an input image, such as the input image 124. The surface normal prediction component 114 receives an input image and employs the trained surface normal model to generate a predicted normal map. In some instances, the predicted normal map is output as the normal map for the input image. In other instances, the surface normal prediction component 114 provides the input image and the predicted normal map from the trained surface normal model to the trained refinement model, which generates a refined normal map that is output as the normal map for the input image.

Figure 3:
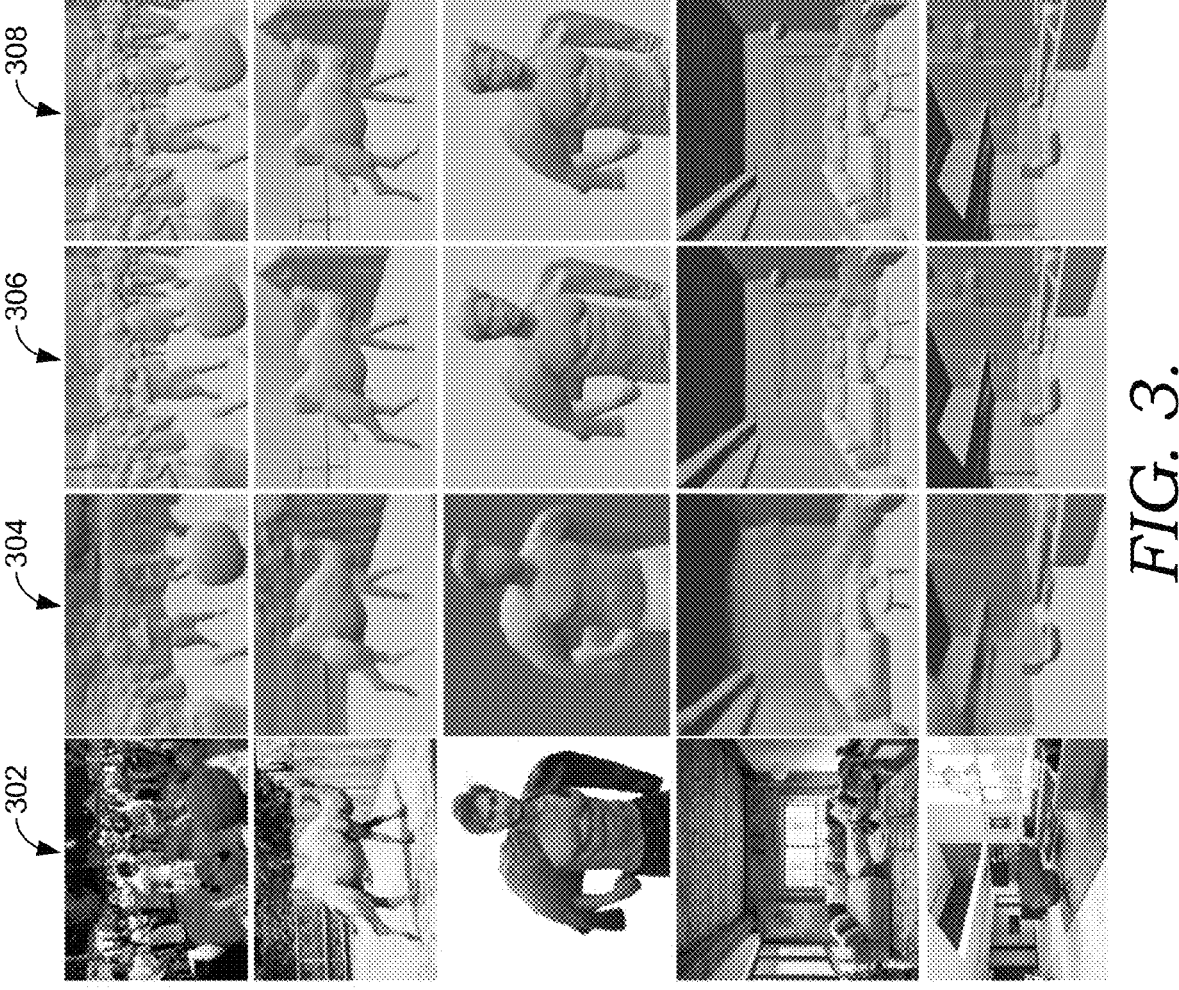
FIG. 3 is a diagram comparing normal maps prepared from images using a prior technique and techniques in accordance with some implementations of the present disclosure.

FIG. 3 provides a comparison of experimental results of normal maps generated by different approaches. In particular, a model was implemented using a transformer-based backbone and mixed datasets, including human body normal data, CG indoor and outdoor data, portrait data, and manually labeled web data. Three approaches were employed: a first approach using conventional pixel-wise regression, a second approach using pair-wise angular regression in accordance with aspects of the technology described herein without refinement, and a third approach using pair-wise angular regression with refinement. The first column 302 in FIG. 3 shows input images, while the other columns 304, 306, 308 provide normal maps generated from the input images using the three approaches. The results from the first approach are shown in column 304, the results from the second approach are shown in column 306, and the results from the third approach are shown in column 308. As can be seen from FIG. 3, the two approaches using aspects of the technology described herein produce normal maps (in columns 306 and 308) that are more detailed than the normal maps generated by the conventional approach (in column 304) for a variety of different types of input images, showing good generalization performance.

Returning to FIG. 1, the user interface component 116 of the surface normal system 104 provides one or more user interfaces for interacting with the surface normal system 104. For instance, the user interface component 116 can provide user interfaces to a user device, such as the user device 102, that are presented on the user device 102 using the application 108. Among other things, the user interfaces provided by the user interface component 116 can enable a user to interact with the surface normal system 104 for training purposes (e.g., configuring aspects of the training, etc.) and/or inference purposes (e.g., providing input images, receiving normal maps output by the system, etc.).

Example Methods

With reference now to FIG. 4, a flow diagram is provided that illustrates a method 400 for training a surface normal model using angular values. The method 400 can be performed, for instance, by the surface normal training component 110 of FIG. 1. Each block of the method 400 and any other methods described herein comprises a computing process performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few.

As shown at block 402, a training dataset is received. The training dataset includes one or more training images and one or more ground truth normal maps. Each ground truth normal map corresponds to a training image, providing ground truth normal vectors for locations of the training image.

The training process can be iteratively performed over a number of training images. As such, the process of blocks 404 through 410 can be performed for each of a number of training images. As shown at block 404, a training image is selected. A predicted normal map is generated by the surface normal model from the training image, as shown at block 406. One or more losses are determined for the predicted normal map using one or more loss functions based on angular values, as shown at block 408. In some aspects, the loss functions can include a pair-wise angular loss function, an up-vector enforcing loss function, and/or a rotation invariant gradient loss function. Training using each of the loss functions is described in further detail below with reference to FIGS. 5-7. As shown at block 410, the surface normal model is updated based on the loss(es) determined at block 408. For instance, backpropagation could be employed to update parameters (e.g., weights) of the surface normal model. Once trained, the surface normal model can be employed to produce predicted normal maps for input images.

Turning next to FIG. 5, a flow diagram is provided showing a method 500 for training a surface normal model using a pair-wise angular loss function. The method 500 can be performed, for instance, by the surface normal training component 110 of FIG. 1. The method 500 is described with reference to a single training iteration using a training image and can be iteratively repeated for each of a number of training images. As shown at block 502, a predicted normal map is generated from a training image using a surface normal model. Angular values between pairs of normal vectors for the predicted normal map are determined, as shown at block 504. Angular values between pairs of normal vectors for the ground truth normal map are also determined, as shown at block 506. In some instances, each pair of normal vectors for the predicted normal map comprises normal vectors from a pair of pixel locations on the predicted normal map, and each pair of normal vectors for the ground truth normal map comprises normal vectors from a corresponding pair of pixel locations on the ground truth normal map. In other instances, each pair of normal vectors for the predicted normal map comprises a normal vector from a pixel location on the predicted normal map and a mean normal vector for the predicted normal map, and each pair of normal vectors for the ground truth normal map comprises a normal vector from a pixel location on the ground truth normal map and a mean normal vector for the ground truth normal map.

A pair-wise angular loss is determined as a function of the difference between the angular values for normal vector pairs for the predicted normal map and the corresponding angular values for normal vector pairs for the ground truth normal map, as shown at block 508. The surface normal model is updated based on the pair-wise angular loss, as shown at block 510. For instance, backpropagation could be employed to update parameters (e.g., weights) of the surface normal model.

FIG. 6 provides a flow diagram showing a method 600 for training a surface normal model using an up-vector enforcing loss function. The method 600 can be performed, for instance, by the surface normal training component 110 of FIG. 1. The method 600 is described with reference to a single training iteration using a training image and can be iteratively repeated for each of a number of training images. As shown at block 602, a predicted normal map is generated from a training image using a surface normal model. Angular values between normal vectors from the predicted normal map and an up-vector from the ground truth normal map are determined, as shown at block 604. Angular values between normal vectors from the ground truth normal map and the up-vector from the ground truth normal map are also determined, as shown at block 606.

As shown at block 608, an up-vector enforcing loss is determined as a function of the difference between the angular values for the predicted normal map determined at block 604 and the corresponding angular values for the ground truth normal map determined at block 606. The surface normal model is updated based on up-vector enforcing loss, as shown at block 610. For instance, backpropagation could be employed to update parameters (e.g., weights) of the surface normal model.

Figure 7:
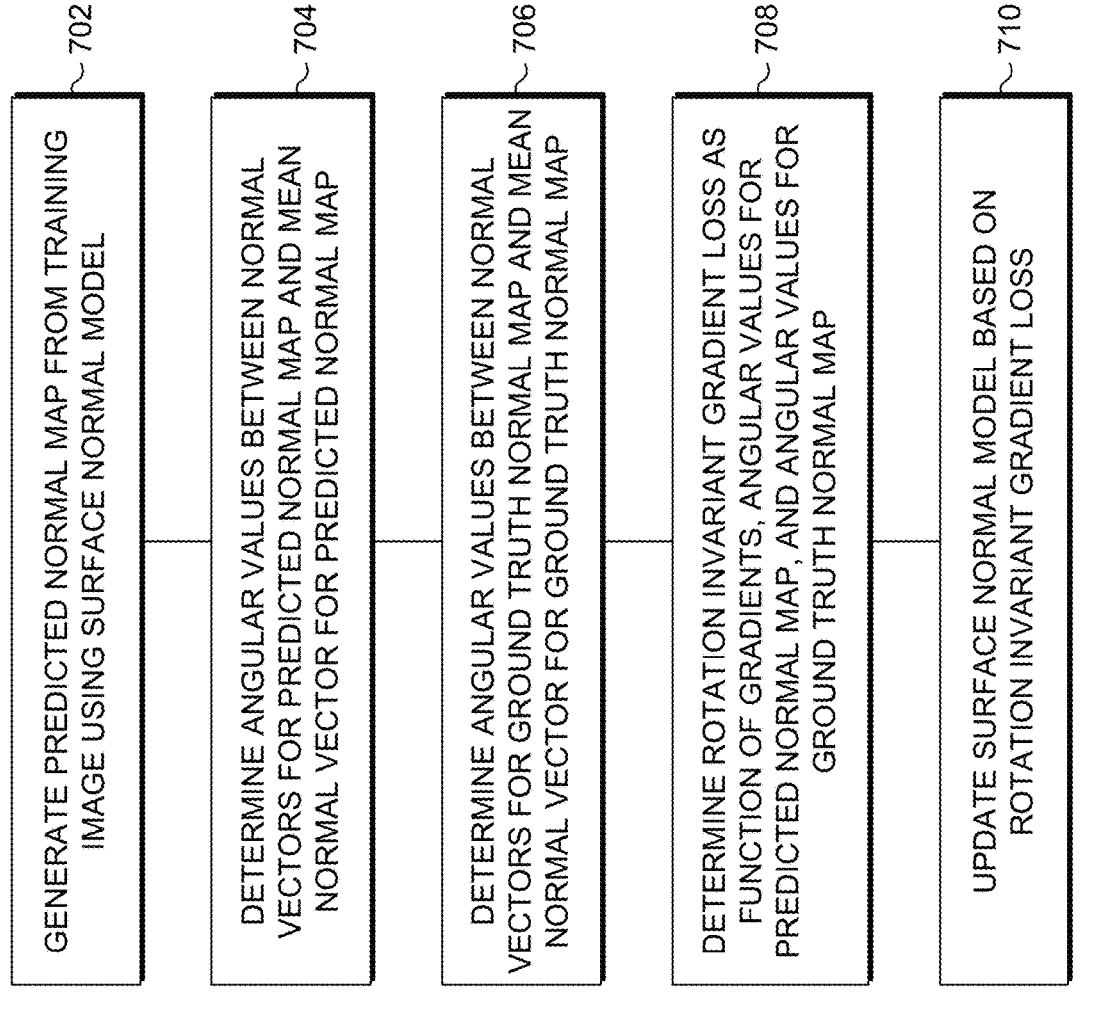
FIG. 7 is a flow diagram showing a method for training a surface normal model using a rotation invariant gradient loss in accordance with some implementations of the present disclosure.

FIG. 7 provides a flow diagram showing a method 700 for training a surface normal model using an rotation invariant gradient loss function. The method 700 can be performed, for instance, by the surface normal training component 110 of FIG. 1. The method 700 is described with reference to a single training iteration using a training image and can be iteratively repeated for each of a number of training images. As shown at block 702, a predicted normal map is generated from a training image using a surface normal model. Angular values between normal vectors from the predicted normal map and a mean normal vector for the predicted normal map are determined, as shown at block 704. Angular values between normal vectors from the ground truth normal map and a mean normal vector for the ground truth normal map are also determined, as shown at block 706.

As shown at block 708, an rotation invariant gradient loss is determined as a function of gradients in the x- and y-directions and the difference between the angular values for the predicted normal map determined at block 704 and the corresponding angular values for the ground truth normal map determined at block 706. In some instances, a rotation invariant multi-scale gradient loss is computed using different resolutions. The surface normal model is updated based on rotation invariant gradient loss, as shown at block 710. For instance, backpropagation could be employed to update parameters (e.g., weights) of the surface normal model.

Figure 8:
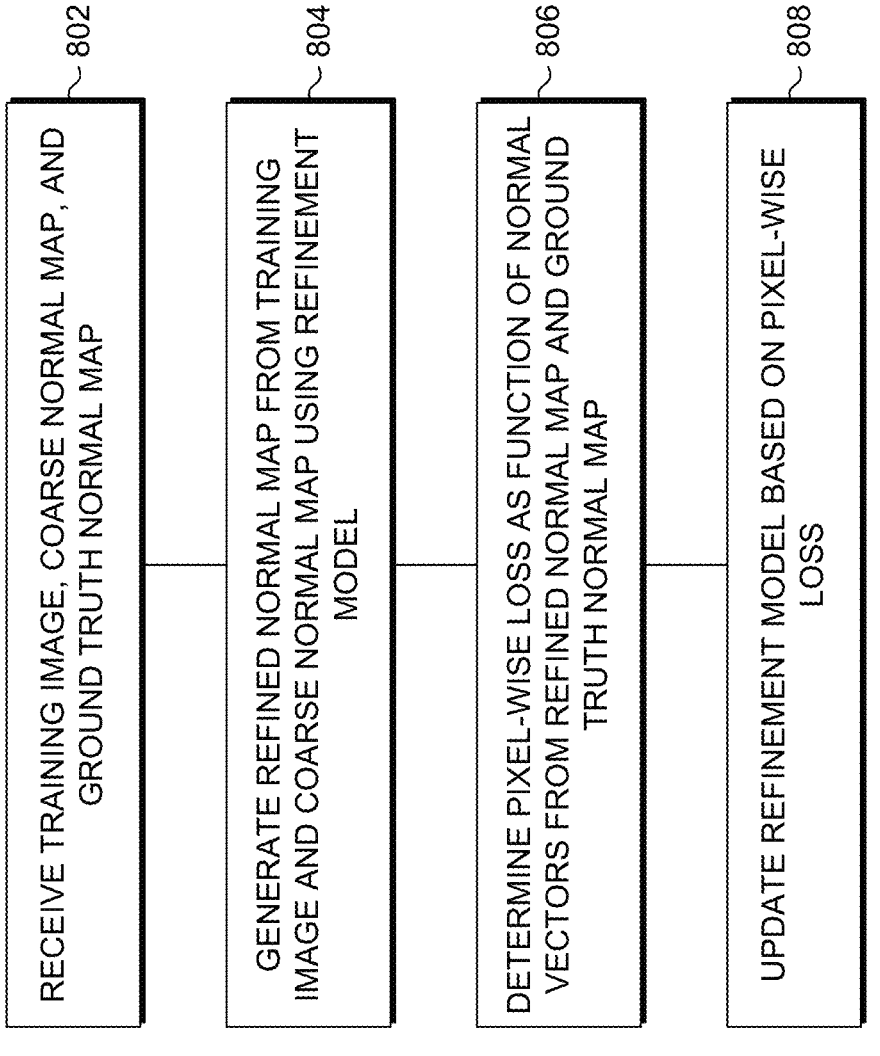
FIG. 8 is a flow diagram showing a method for training a refinement model in accordance with some implementations of the present disclosure.

With reference next to FIG. 8, a flow diagram is provided showing a method 800 for training a refinement model. The method 800 can be performed, for instance, by the refinement training component 112 of FIG. 1. The method 800 is described with reference to a single training iteration using a training image and can be iteratively repeated for each of a number of training images. As shown at block 802, a training image, a coarse normal map for the training image, and a ground truth normal map for the training image are received. In some instances, the coarse normal map is a predicted normal map generated from the training image by a surface normal model. In other instances, the coarse normal map is generated by blurring and corrupting the ground truth normal map for the training image.

As shown at block 804, a refined normal map is generated from the training image and the coarse normal map using the refinement model. A pixel-wise loss is determined as a function of the difference between normal vectors from the refined normal map and corresponding normal vectors from the ground truth normal map, as shown at block 806. The refinement model is updated based on the pixel-wise loss, as shown at block 808. For instance, backpropagation could be employed to update parameters (e.g., weights) of the refinement model.

Figure 9:
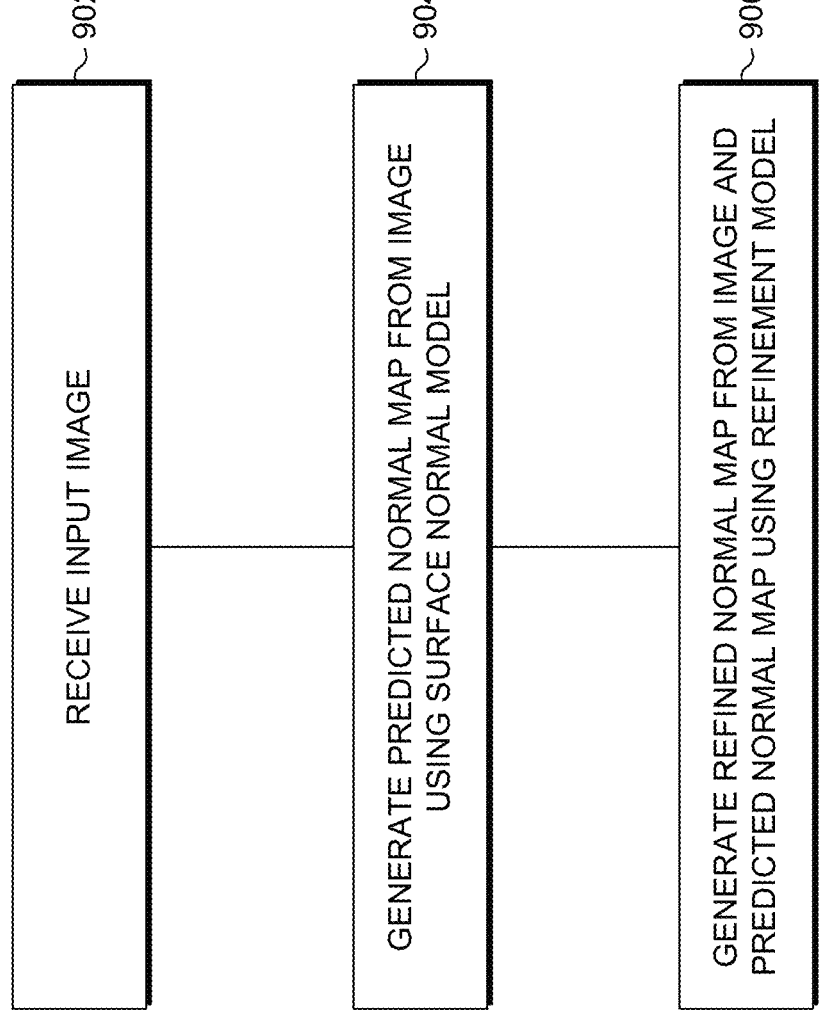
FIG. 9 is a flow diagram showing a method for generating a normal map for an image in accordance with some implementations of the present disclosure.

FIG. 9 is a flow diagram showing a method 900 for generating a normal map from a single input image (e.g., an RGB image). The method 900 can be performed, for instance, by the surface normal prediction component 114 of FIG. 1. As shown at block 900, an input image is received. A predicted normal map is generated from the input image using a trained surface normal model (e.g., trained in accordance with method 400, 500, 600, and/or 700), as shown at block 902. In some configurations, the predicted normal map from the surface normal map is provided as the normal map for the input image. In other configuration, such as that shown in FIG. 9, a refined normal map is generated from the input image and the predicted normal map using a trained refinement model (e.g., trained in accordance with the method 800), as shown at block 906, and the refined normal map is provided as the normal map for the input image.

Exemplary Operating Environment

Figure 10:
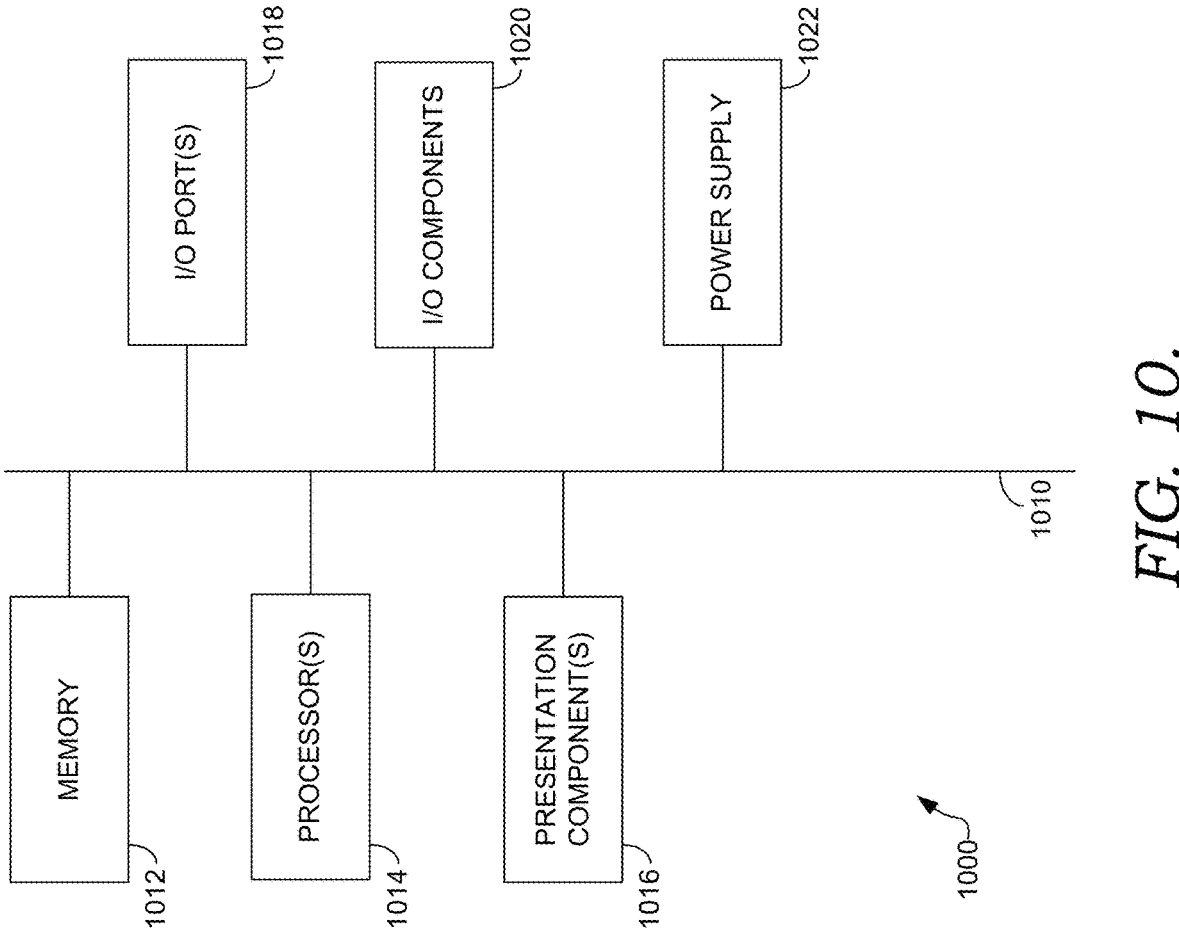
FIG. 10 is a block diagram of an exemplary computing environment suitable for use in implementations of the present disclosure.

Having described implementations of the present disclosure, an exemplary operating environment in which embodiments of the present technology can be implemented is described below in order to provide a general context for various aspects of the present disclosure. Referring initially to FIG. 10 in particular, an exemplary operating environment for implementing embodiments of the present technology is shown and designated generally as computing device 1000. Computing device 1000 is but one example of a suitable computing environment and is not intended to suggest any limitation as to the scope of use or functionality of the technology. Neither should the computing device 1000 be interpreted as having any dependency or requirement relating to any one or combination of components illustrated.

The technology can be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The technology can be practiced in a variety of system configurations, including hand-held devices, consumer electronics, general-purpose computers, more specialty computing devices, etc. The technology can also be practiced in distributed computing environments where tasks are performed by remote-processing devices that are linked through a communications network.

With reference to FIG. 10, computing device 1000 includes bus 1010 that directly or indirectly couples the following devices: memory 1012, one or more processors 1014, one or more presentation components 1016, input/output (I/O) ports 1018, input/output components 1020, and illustrative power supply 1022. Bus 1010 represents what can be one or more busses (such as an address bus, data bus, or combination thereof). Although the various blocks of FIG. 10 are shown with lines for the sake of clarity, in reality, delineating various components is not so clear, and metaphorically, the lines would more accurately be grey and fuzzy. For example, one can consider a presentation component such as a display device to be an I/O component. Also, processors have memory. The inventors recognize that such is the nature of the art, and reiterate that the diagram of FIG. 10 is merely illustrative of an exemplary computing device that can be used in connection with one or more embodiments of the present technology. Distinction is not made between such categories as "workstation," "server," "laptop," "hand-held device," etc., as all are contemplated within the scope of FIG. 10 and reference to "computing device."

Computing device 1000 typically includes a variety of computer-readable media. Computer-readable media can be any available media that can be accessed by computing device 1000 and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1000. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1012 includes computer storage media in the form of volatile and/or nonvolatile memory. The memory can be removable, non-removable, or a combination thereof. Exemplary hardware devices include solid-state memory, hard drives, optical-disc drives, etc. Computing device 1000 includes one or more processors that read data from various entities such as memory 1012 or I/O components 1020. Presentation component(s) 1016 present data indications to a user or other device. Exemplary presentation components include a display device, speaker, printing component, vibrating component, etc.

I/O ports 1018 allow computing device 1000 to be logically coupled to other devices including I/O components 1020, some of which can be built in. Illustrative components include a microphone, joystick, game pad, satellite dish, scanner, printer, wireless device, etc. The I/O components 1020 can provide a natural user interface (NUI) that processes air gestures, voice, or other physiological inputs generated by a user. In some instance, inputs can be transmitted to an appropriate network element for further processing. A NUI can implement any combination of speech recognition, touch and stylus recognition, facial recognition, biometric recognition, gesture recognition both on screen and adjacent to the screen, air gestures, head and eye-tracking, and touch recognition associated with displays on the computing device 1000. The computing device 1000 can be equipped with depth cameras, such as, stereoscopic camera systems, infrared camera systems, RGB camera systems, and combinations of these for gesture detection and recognition. Additionally, the computing device 1000 can be equipped with accelerometers or gyroscopes that enable detection of motion.

The present technology has been described in relation to particular embodiments, which are intended in all respects to be illustrative rather than restrictive. Alternative embodiments will become apparent to those of ordinary skill in the art to which the present technology pertains without departing from its scope.

Having identified various components utilized herein, it should be understood that any number of components and arrangements can be employed to achieve the desired functionality within the scope of the present disclosure. For example, the components in the embodiments depicted in the figures are shown with lines for the sake of conceptual clarity. Other arrangements of these and other components can also be implemented. For example, although some components are depicted as single components, many of the elements described herein can be implemented as discrete or distributed components or in conjunction with other components, and in any suitable combination and location. Some elements can be omitted altogether. Moreover, various functions described herein as being performed by one or more entities can be carried out by hardware, firmware, and/or software, as described below. For instance, various functions can be carried out by a processor executing instructions stored in memory. As such, other arrangements and elements (e.g., machines, interfaces, functions, orders, and groupings of functions) can be used in addition to or instead of those shown.

Embodiments described herein can be combined with one or more of the specifically described alternatives. In particular, an embodiment that is claimed can contain a reference, in the alternative, to more than one other embodiment. The embodiment that is claimed can specify a further limitation of the subject matter claimed.

The subject matter of embodiments of the technology is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" can be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further, the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present technology are described with reference to a distributed computing environment; however, the distributed computing environment depicted herein is merely exemplary. Components can be configured for performing novel embodiments of embodiments, where the term "configured for" can refer to "programmed to" perform particular tasks or implement particular abstract data types using code. Further, while embodiments of the present technology can generally refer to the technical solution environment and the schematics described herein, it is understood that the techniques described can be extended to other implementation contexts.

From the foregoing, it will be seen that this technology is one well adapted to attain all the ends and objects set forth above, together with other advantages which are obvious and inherent to the system and method. It will be understood that certain features and subcombinations are of utility and can be employed without reference to other features and subcombinations. This is contemplated by and is within the scope of the claims.

What is claimed is:

1. One or more computer storage media storing computer-useable instructions that, when used by a computing device, cause the computing device to perform operations, the operations comprising:

receiving a training dataset comprising a plurality of training images in different coordinate systems and a plurality of ground truth normal maps for the plurality of training images; and using the training dataset, training a surface normal model to output surface normal maps for input images, wherein the surface normal model is trained using a first training image and a first ground truth normal map from the training dataset by:

providing the first training image as input to the surface normal model, receiving, from the surface normal model, a predicted normal map directly output by the surface normal model processing the first training image, determining a pair-wise angular loss invariant to the different coordinate systems as a function of angular values between pairs of normal vectors for the predicted normal map and corresponding angular values between pairs of normal vectors for the first ground truth normal map, and updating the surface normal model based on the pair-wise angular loss.

2. The one or more computer storage media of claim 1, wherein a first angular value between a first pair of normal vectors for the predicted normal map is determined based a normal vector for a first pixel from the predicted normal map and a normal vector for a second pixel from the predicted normal map, and wherein a first corresponding angular value between a first pair of normal vectors for the first ground truth normal map is determined based on a normal vector for a first pixel from the first ground truth normal map corresponding to the first pixel from the predicted normal map and a normal vector for a second pixel from the first ground truth normal map corresponding to the second pixel from the predicted normal map.

3. The one or more computer storage media of claim 1, wherein a first angular value between a first pair of normal vectors for the predicted normal map is determined based on a normal vector for a first pixel from the predicted normal map and a mean normal vector for the predicted normal map, and wherein a first corresponding angular value between a first pair of normal vectors for the first ground truth normal map is determined based on a normal vector for a first pixel from the first ground truth normal map corresponding to the first pixel from the predicted normal map and a mean normal vector for the first ground truth predicted normal map.

4. The one or more computer storage media of claim 1, wherein a first angular value between a first pair of normal vectors for the predicted normal map is determined as a dot product between the first pair of normal vectors for the predicted normal map, and wherein a first corresponding angular value between a first pair of normal vectors for the first ground truth normal map is determined as a dot product between the first pair of normal vectors from the first ground truth normal map.

5. The one or more computer storage media of claim 1, wherein training the surface normal model further comprises:

determining a second loss as a function of angular values between normal vectors for the predicted normal map and an up-vector from the first ground truth normal map and corresponding angular values between normal vectors for the first ground truth normal map and the up-vector; and updating the surface normal model based on the second loss.

6. The one or more computer storage media of claim 1, wherein training the surface normal model further comprises:

determining a second loss as a function of gradients along x- and y-directions, angular values between normal vectors for the predicted normal map and a mean normal vector for the predicted normal map, and corresponding angular values between normal vectors for the first ground truth normal map and a mean normal vector for the first ground truth normal map; and updating the surface normal model based on the second loss.

7. The one or more computer storage media of claim 1, wherein the operations further comprise:

training a refinement model by:

generating, by the refinement model, a refined normal map using the first training image and a coarse normal map for the first training image;

determining a second loss as a function of normal vectors from the refined normal map and corresponding normal vectors from the first ground truth normal map; and updating the refinement model based on the second loss.

8. The one or more computer storage media of claim 1, wherein the operations further comprise:

receiving an input image; and generating, by the trained surface normal map, a normal map from the input image.

9. The one or more computer storage media of claim 7, wherein the coarse normal map for the first training image comprises the predicted normal map.

10. The one or more computer storage media of claim 7, wherein the operations further comprise:

generating the coarse normal map by applying one or more manipulations to the first ground truth normal map.

11. A computer-implemented method comprising:

receiving, by a surface normal training component, a training dataset comprising a plurality of training images in different coordinate systems and a plurality of ground truth normal maps for the plurality of training images; and using the training dataset, training, by the surface normal training component, a surface normal model to output surface normal maps for input images, wherein the surface normal model is trained using a pair-wise angular loss invariant to the different coordinate systems that is determined for pairs of training images and ground truth normal maps from the training dataset, wherein a first pair-wise angular loss is determined for a first training image and a first ground truth normal map from the training dataset as a function of differences between angular values for pairs of normal vectors for a predicted normal map output by the surface normal model processing the first training image as input and corresponding angular values between pairs of normal vectors for the first ground truth normal map.

12. The computer-implemented method of claim 11, wherein a first angular value between a first pair of normal vectors for the predicted normal map is determined based a normal vector for a first pixel from the predicted normal map and a normal vector for a second pixel from the predicted normal map, and wherein a first corresponding angular value between a first pair of normal vectors for the first ground truth normal map is determined based on a normal vector for a first pixel from the first ground truth normal map corresponding to the first pixel from the predicted normal map and a normal vector for a second pixel from the first ground truth normal map corresponding to the second pixel from the predicted normal map.

13. The computer-implemented method of claim 11, wherein a first angular value between a first pair of normal vectors for the predicted normal map is determined based on a normal vector for a first pixel from the predicted normal map and a mean normal vector for the predicted normal map, and wherein a first corresponding angular value between a first pair of normal vectors for the first ground truth normal map is determined based on a normal vector for a first pixel from the first ground truth normal map corresponding to the first pixel from the predicted normal map and a mean normal vector for the first ground truth predicted normal map.

14. The computer-implemented method of claim 11, wherein training the surface normal model further comprises:

determining a second loss as a function of angular values between normal vectors for the predicted normal map and an up-vector from the first ground truth normal map and corresponding angular values between normal vectors for the first ground truth normal map and the up-vector; and updating the surface normal model based on the second loss.

15. The computer-implemented method of claim 11, wherein training the surface normal model further comprises:

determining a second loss as a function of gradients along x- and y-directions, angular values between normal vectors for the predicted normal map and a mean normal vector for the predicted normal map, and corresponding angular values between normal vectors for the first ground truth normal map and a mean normal vector for the first ground truth normal map; and updating the surface normal model based on the second loss.

16. The computer-implemented method of claim 11, wherein the operations further comprise:

training a refinement model by:

generating, by the refinement model, a refined normal map using the first training image and a coarse normal map for the first training image;

determining a second loss as a function of normal vectors from the refined normal map and corresponding normal vectors from the first ground truth normal map; and updating the refinement model based on the second loss.

17. The computer-implemented method of claim 16, wherein the coarse normal map for the first training image comprises the predicted normal map.

18. The computer-implemented method of claim 16, wherein the operations further comprise:

generating the coarse normal map by applying one or more manipulations to the first ground truth normal map.

19. A computer system comprising:

one or more processors; and one or more computer storage media storing computer-useable instructions that, when used by the one or more processors, causes the one or more processors to perform operations comprising:

receiving, by a surface normal prediction component, an input image; and generating, by the surface normal prediction component, a normal map from the input image using a surface normal model trained to output surface normal maps for input images, the surface normal model trained on a training dataset comprising a plurality of training images in different coordinate systems and a plurality of ground truth normal maps for the plurality of training images, and wherein the surface normal model is trained using a pair-wise angular loss invariant to the different coordinate systems and determined as a function of differences between angular values for pairs of normal vectors for a predicted normal map output by the surface normal model processing a training image and corresponding angular values between pairs of normal vectors for a ground truth normal map for the training image.

20. The computer system of claim 19, wherein the operations further comprise:

generating a refined normal map from the input image and the normal map using a refinement model trained using a second loss determined as a function of normal vectors from a training refined normal map generated by the refinement normal map using the training image and a coarse normal map for the training image and corresponding normal vectors from the ground truth normal map.

* * * * *